(12) United States Patent
Davis (10) Patent No.: US 8,967,696 B2
(45) Date of Patent: Mar. 3, 2015

(54) FUEL PORT AND METHOD

(71) Applicant: Intellectual Property Holdings, LLC, Cleveland, OH (US)

(72) Inventor: Ryan Adam Davis, Murray, UT (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 135 days.

(21) Appl. No.: 13/827,422

(22) Filed: Mar. 14, 2013

(65) Prior Publication Data

US 2013/0327782 A1 Dec. 12, 2013

Related U.S. Application Data

(60) Provisional application No. 61/658,734, filed on Jun. 12, 2012.

(51) Int. Cl.
*B62D 25/00* (2006.01)
*B60K 15/04* (2006.01)
*B60K 15/01* (2006.01)
*B60K 15/03* (2006.01)

(52) U.S. Cl.
CPC ....... *B60K 15/04* (2013.01); *B60K 2015/03019* (2013.01); *B60K 15/013* (2013.01); *B60K 15/03006* (2013.01); *B60K 2015/0474* (2013.01)

USPC .......................................... 296/97.22; 220/86.2

(58) Field of Classification Search
USPC ................................ 296/1.07, 97.22; 220/86.2
See application file for complete search history.

(56) References Cited

U.S. PATENT DOCUMENTS 1,440,940 A * 1/1923 Smith et al. .................. 261/41.1

OTHER PUBLICATIONS

Catalogue 15, CNG Refuelling High-Performance Components for Natural Gas Vehicles and Fuelling Stations, WEH®, 14 pages, available at http://www.weh.com/catalogue (2013).

* cited by examiner

*Primary Examiner* — Lori L Lyjak
(74) *Attorney, Agent, or Firm* — Calfee, Halter & Griswold LLP (57) ABSTRACT

The present application discloses a fuel port and methods of installing a fuel port. In certain embodiments, the fuel port comprises a fuel receptacle, a body portion that forms a cavity for the fuel receptacle, and one or more securing portions movably coupled to the body portion. The body portion comprises a first end, a second end, at least one sidewall extending between the first end and the second end, and at least one flange extending from the sidewall. The one or more securing portions are configured to hold a portion of a device between the flange of the body portion and the one or more securing portions to secure the fuel port to the device.

33 Claims, 5 Drawing Sheets

FUEL PORT AND METHOD

CROSS REFERENCE TO RELATED APPLICATION

This application is a U.S. Non-Provisional patent application which claims priority to U.S. Provisional Patent Application No. 61/658,734, filed on Jun. 12, 2012 and titled "AVS Dura-Mount CNG Fill Pot," which is hereby incorporated by reference in its entirety.

BACKGROUND

Gasoline vehicles generally have a gasoline fuel line with a removable cap extending from the vehicle body and accessible to the user. The receiving end of the fuel line is often disposed in a cavity of the vehicle body and hidden behind a door. When a gasoline vehicle is converted to run on an alternative fuel such as compressed natural gas ("CNG"), the gasoline fuel line is sometimes removed and replaced with a fuel receptacle and fuel line for the alternative fuel. However, the existing cavity in the vehicle body is often too small to accommodate certain alternative fuel receptacles. Further, when a gasoline vehicle is converted to run on both gasoline and an alternative fuel, another fuel port is often needed to accommodate the fuel receptacle and fuel line for the alternative fuel.

SUMMARY

The present application discloses a fuel port and methods of installing a fuel port in a device such as a vehicle.

In certain embodiments, the fuel port comprises a fuel receptacle, a body portion that forms a cavity for the fuel receptacle, and one or more securing portions movably coupled to the body portion. The body portion comprises a first end, a second end, at least one sidewall extending between the first end and the second end, and at least one flange extending from the sidewall. The securing portion is configured to hold a portion of a device, such as a vehicle sidewall, between the flange of the body portion and the securing portion to secure the fuel port to the device.

In certain embodiments, a fuel port for a vehicle configured to operate using compressed natural gas fuel is disclosed. The fuel port comprises a compressed natural gas fuel receptacle, a housing that forms a cavity for the fuel receptacle, and a mounting ring threadably coupled to an outer surface of the housing. The housing comprises a first end, a second end, a cylindrical sidewall extending between the first end and the second end, and a flange extending from the sidewall at the first end. The mounting ring is configured to hold a portion of the vehicle between the flange of the housing and the mounting ring to secure the fuel port to the vehicle. Further, the flange circumferentially surrounds an opening in the vehicle when the fuel port is secured to the vehicle and the portion of the vehicle is held between a circumferential face of the flange and a circumferential face of the mounting ring when the fuel port is secured to the vehicle.

In certain embodiments, the method of installing a fuel port comprises utilizing a fuel port having a fuel receptacle, a body portion that forms a cavity for the fuel receptacle, and one or more securing portion movably coupled to the body portion. The body portion has a first end, a second end, at least one sidewall extending between the first end and the second end, and at least one flange extending from the sidewall. The body portion of the fuel port is inserted into an opening in a device until the flange contacts a portion of the device around the opening. The securing portion is coupled to the body portion to hold the portion of the device between the flange of the body portion and the securing portion to secure the fuel port to the device.

These and additional embodiments will become apparent in the course of the following detailed description.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of the inventions.

DESCRIPTION OF EMBODIMENTS

The present application discloses a fuel port and methods of mounting a fuel port to a device. The fuel port generally comprises a housing or body portion that forms a cavity for a fuel receptacle and one or more securing portions movably coupled to the body portion and configured to hold a portion of a device between the body portion and the securing portion to secure the fuel port to the device. The fuel port of the present application is configured such that it may be used with a variety of fuel receptacles, such as, for example, CNG, Liquid Natural Gas (LNG), Liquid Petroleum Gas (LPG), Hydrogen, Hythane, or Butane fuel receptacles or other receptacles for various liquid fuels, gaseous fuels and mixtures thereof.

The fuel port of the present application may be used with any device requiring fueling or refueling, including, but not limited to: motorized vehicles such as cars, trucks, motorcycles, scooters, construction vehicles, cargo trucks, buses, military vehicles, planes, trains, tractors, farm machinery, golf carts, etc.; equipment such as certain construction equipment, equipment for transferring fuel, lawn equipment, grills, tanks, generators, compressors, certain household equipment, furnaces, hot water heaters, or the like; and various types of machinery such as certain industrial or manufacturing machinery. Although the fuel port is described herein as being used with a vehicle, such as a vehicle configured to operate using compressed natural gas, it should be understood that the fuel port of the present application may be configured for use with any device that requires fuel.

The fuel port of the present application is configured such that it is easily and quickly mounted to a vehicle. The fuel port is also configured such that it may be mounted to a variety of materials of various thicknesses, including plastic components and a thin sheet metal less than about 0.625 inch thick. As such, the fuel port facilitates the rapid conversion of about any vehicle to operate using a second fuel such as CNG. Further, the fuel port may be mounted to about any portion of the vehicle. The fuel port of the present application may be used as a primary fuel port for the vehicle or a secondary fuel"

port, such as for those vehicles configured to selectively operate using the original fuel (e.g., gasoline) and/or the second fuel (e.g., CNG).

The fuel port the present application also has a clean looking appearance and is durable. In certain embodiments, the fuel receptacle is secured within the cavity of the body portion such that it is protected and the receiving end of the fuel receptacle does not extend outside the cavity. Further, the fuel port may be secured to the vehicle such that no bolts or other fasteners are visible on the exterior or face of the fuel port. In certain embodiments, the face of the fuel port is used to display various refueling requirements, e.g., the CNG refueling requirements found in NFPA52-2010, thus reducing the amount of labeling needed on the vehicle.

Figure 1:
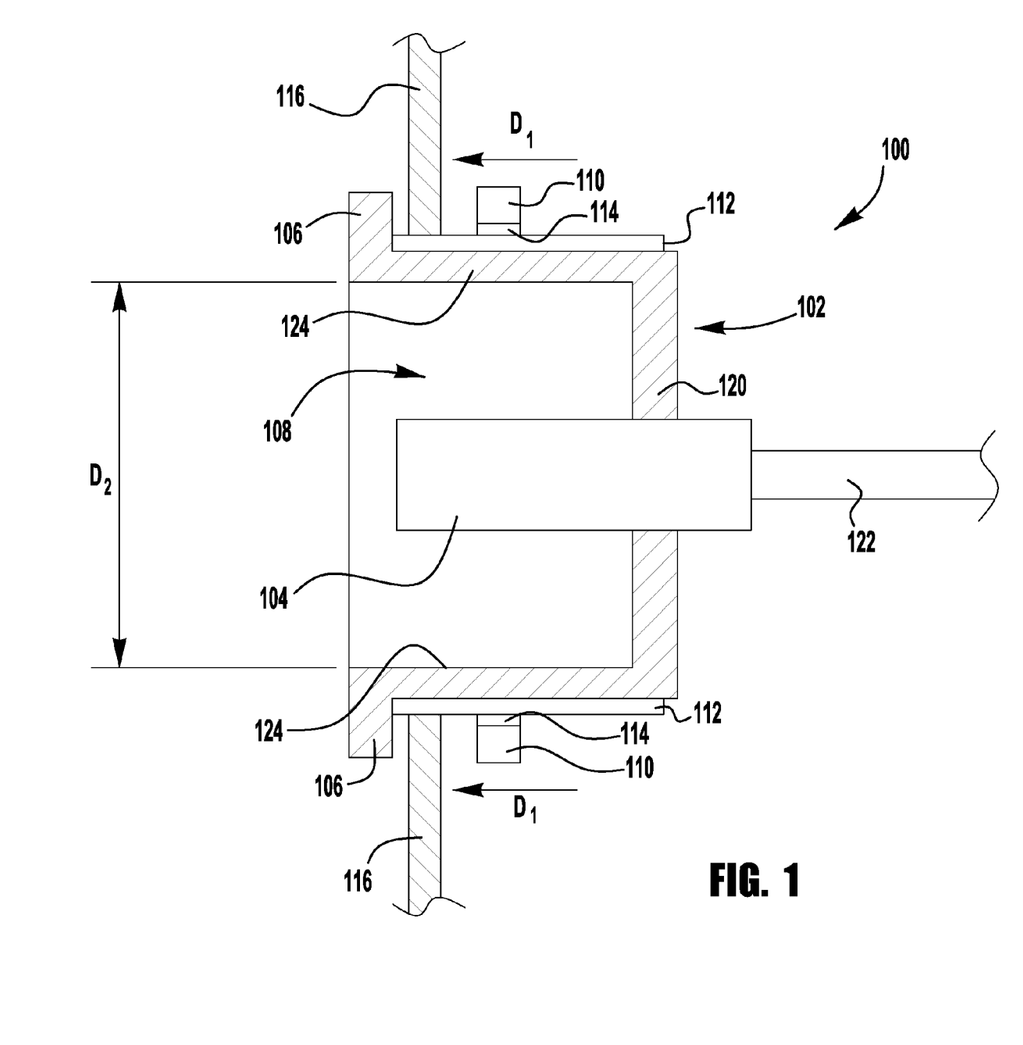
FIG. 1 is a cross sectional side view of a fuel port according to an embodiment the present application.

FIG. 1 illustrates a fuel port 100 according to an embodiment of the present application. The fuel port 100 comprises a housing or body portion 102 and one or more securing portion 110 movably coupled to the body portion. As shown, the securing portion 110 is moved in a direction $D_1$ relative to the body portion 102 to hold a portion 116 of the vehicle between one or more shoulder or flange 106 of the body portion and the securing portion to secure the fuel port 100 to the vehicle. Further, the securing portion 110 may be adjusted relative to the body portion 102 to secure the fuel port 100 to portions of the vehicle having various thicknesses, such as, for example thicknesses ranging from about 0.01 inch to about 0.625 inch.

The body portion 102 forms a cavity 108 for a fuel receptacle 104. The fuel receptacle 104 is secured within the cavity 108 such that it is protected and the receiving end of the fuel receptacle does not extend outside the cavity. As illustrated in FIG. 1, the fuel receptacle 104 is secured in an opening in an end wall 120 of the body portion 102 and connected to a fuel line 122. In certain embodiments, a connector or fitting may be used between the fuel receptacle 104 and the fuel line 122. As described above, the fuel receptacle 104 may be a variety fuel receptacles of different shapes and sizes for variety of different fuels or mixtures thereof. In certain embodiments, the fuel receptacle 104 is a NGV1 Standard CNG fuel receptacle. The body portion 102 may or may not have a covering or door that covers the opening to the cavity 108, e.g., one or more hinged doors that may or may not be biased toward a closed position.

The cavity 108 of the body portion 102 is at least partially formed by one or more sidewall 124. The sidewall 124 of the body portion 102 may take a variety of different forms. For example, the sidewall 124 may form a cylinder, truncated cone, or hemisphere and may comprise one or more cross sections shaped as a circle, triangle, rectangle, square, trapezoid, hexagon, diamond, helix, or other shapes. The sidewall 124 may also be bowed or curved. In certain embodiments, the sidewall 124 is cylindrical such that the securing portion 110 may be rotatably coupled to the body portion 102. Further, the cavity 108 of the body portion may be a variety shapes and sizes to accommodate a variety of different fuel receptacles 104. For example, the inner diameter $D_2$ of the body portion 102 may range between about 2 inches and about 4 inches. In certain embodiments, the inner diameter $D_2$ is about 2.75 inches.

As illustrated in FIG. 1, the sidewall 124 of the body portion 102 comprises a first attachment portion 112 that is configured to mate with a second attachment portion 114 of the securing portion 110 to movably couple the body portion to the securing portion. The first and second attachment portions 112 and 114 may be a variety of securing mechanisms or devices capable of attaching the body portion 102 to the vehicle 116. For example, the attachment portions 112 and 114 may be configured such that the securing portion 110 slides longitudinally along one or more sidewall 124 of the body portion 102. Exemplary attachment portions 112 and 114 may include, but are not limited to, one or more guide and rail/channel, wheel and rail/channel, tongue and groove, pin and groove, ratcheting mechanism, rack and pinion, linkage, or other linear motion or sliding mechanism. Further, the attachment portions 112 and 114 may be configured such that the securing portion 110 is rotatably coupled to the body portion 102, such as, for example, with mating threads, helical grooves and projections, or other coupling mechanisms or devices.

The securing portion 110 and/or the body portion 102 are generally configured such that the portion 116 of the vehicle is held between the flange 106 of the body portion and the securing portion. For example, in certain embodiments, the attachment portions 112 and 114 may comprise a locking mechanism or locking device that prohibits movement of the securing portion 110 relative to the body portion 102. As such, once the securing portion 110 is adjusted relative to the body portion 102 and the portion 116 of the vehicle is captured between the flange 106 and the securing portion, the locking mechanism or device is engaged to prohibit movement of the securing portion relative to the body portion. Exemplary locking mechanisms or devices include, but are not limited to, one or more set screws, braking devices, stops, frictional or interference fit, pins, springs, catches, pawl/notch, clamps, or other mechanisms or devices capable of prohibiting movement of the securing portion 110 relative to the body portion 102.

The securing portion 110 may be moved relative to the body portion 102 by rotating the securing portion relative to the body portion and/or sliding the securing portion relative to the body portion to pinch, squeeze, or otherwise capture the vehicle 116 between the shoulder or flange 106 of the body portion and the securing portion. As illustrated in FIG. 1, the shoulder or flange 106 extends outward from the sidewall 124 at an end of the body portion 102. However, in certain embodiments, one or more shoulders or flanges may extend from the sidewall 124 at any location along the length sidewall. As such, at least a portion of the body portion 102 (e.g., the sidewall 124) may extend outward from the vehicle 116 such that it is visible or not hidden by the vehicle body. Further, the shoulder or flange 106 may be adjustable such that it may be selectively moved relative to the body portion 102 and the body portion may extend various distances from the vehicle body 116. The shoulder or flange 106 may or may not circumferentially surround the sidewall 124 of the body portion 102. In certain embodiments, the shoulder or flange 106 may at least partially surround the sidewall 124 of the body portion 102.

In certain embodiments, the fuel port 100 may comprise a seal between the body portion and the vehicle body 116 to prohibit the passage of water or other liquids between the fuel port and vehicle interface. For example, the seal may be a ring seal or gasket positioned between the flange 106 of the body portion 102 and the securing portion 110. The seal may be constructed from a variety of materials, such as, for example, neoprene, rubber, EPDM, Nitrile/Buna, or the like. In certain embodiments, a sealing compound or caulk may be used to seal body portion 102 and the vehicle body 116.

The fuel port 100 components may be constructed of a variety of materials. Exemplary materials for the body portion 102 and the securing portion 110 include, but are not limited to, plastic, liquid photopolymers, ferrous materials such as steel or stainless steel, or non-ferrous materials such as aluminum. In certain embodiments, the body portion 102 and the securing portion 110 are constructed of aluminum. In other embodiments, the body portion 102 and the securing portion 110 are made of stainless steel.

The securing portion 110 may be a variety of shapes and sizes. For example, in certain embodiments, the securing portion 110 comprises a circular mounting ring movably coupled to the outer surface of the sidewall 124. The mounting ring generally comprises a locking face that contacts the vehicle body 116 to secure the fuel port 100 to the vehicle. In other embodiments, the securing portion 110 comprises one or more members, such as, for example, blocks or wedges, having a locking face that contacts the vehicle body 116 to secure the fuel port 100 to the vehicle. The securing portion 110 may or may not circumferentially surround the body portion 102. In certain embodiments, the securing portion 110 may at least partially surround the body portion 102. The locking face of the securing portion 110 may comprise grooves, projections, and/or ridges that may form one or more patterns on the locking face and facilitate securement of the fuel port 100 to the vehicle.

An exemplary method of installing the fuel port 100 comprises forming an opening in a portion of the vehicle, such as a body panel, hood, bed, cab, bumper, trunk or other portion of the vehicle. The opening may be formed in a variety of ways and may be sized and shaped to resemble the body portion 102 of the fuel port 100. For example, in certain embodiments, a circular opening is formed in a portion of the vehicle having a diameter that is just slightly larger than the outer diameter of the cylindrical sidewall of the fuel port (e.g., between about 0.015 inch and about 0.5 inch larger). The body portion 102 of the fuel port 100 is inserted into the opening until the flange 106 contacts the vehicle body 116 around the opening. In certain embodiments, a seal is positioned between the flange 106 and the vehicle body 116. The fuel receptacle 104 may be secured to the body portion 102 before or after the body portion is inserted into the opening.

Furthermore, the securing portion 110 is coupled to the body portion 102 and moved in the direction $D_1$ until a locking face of the securing portion contacts the vehicle body 116. As such, the securing portion 110 is adjusted relative to the body portion 102 and the portion 116 of the vehicle is captured between the flange 106 and the securing portion. A locking mechanism or locking device of the securing portion 110 and/or the body portion 102 is engaged to prohibit movement of the securing portion relative to the body portion. In certain embodiments, the securing portion 110 is a mounting ring threaded onto the outer surface of the sidewall 124 and tightened against the vehicle body 116. Further, set screws are used to secure the mounting ring to the vehicle body 116 and prohibit rotation of the mounting ring relative to the body portion 102. The fuel line 122 is connected to the fuel receptacle 104. In certain embodiments, the fuel line 122 is connected to a connector that is in fluid communication with the fuel receptacle 104.

Figure 2A:
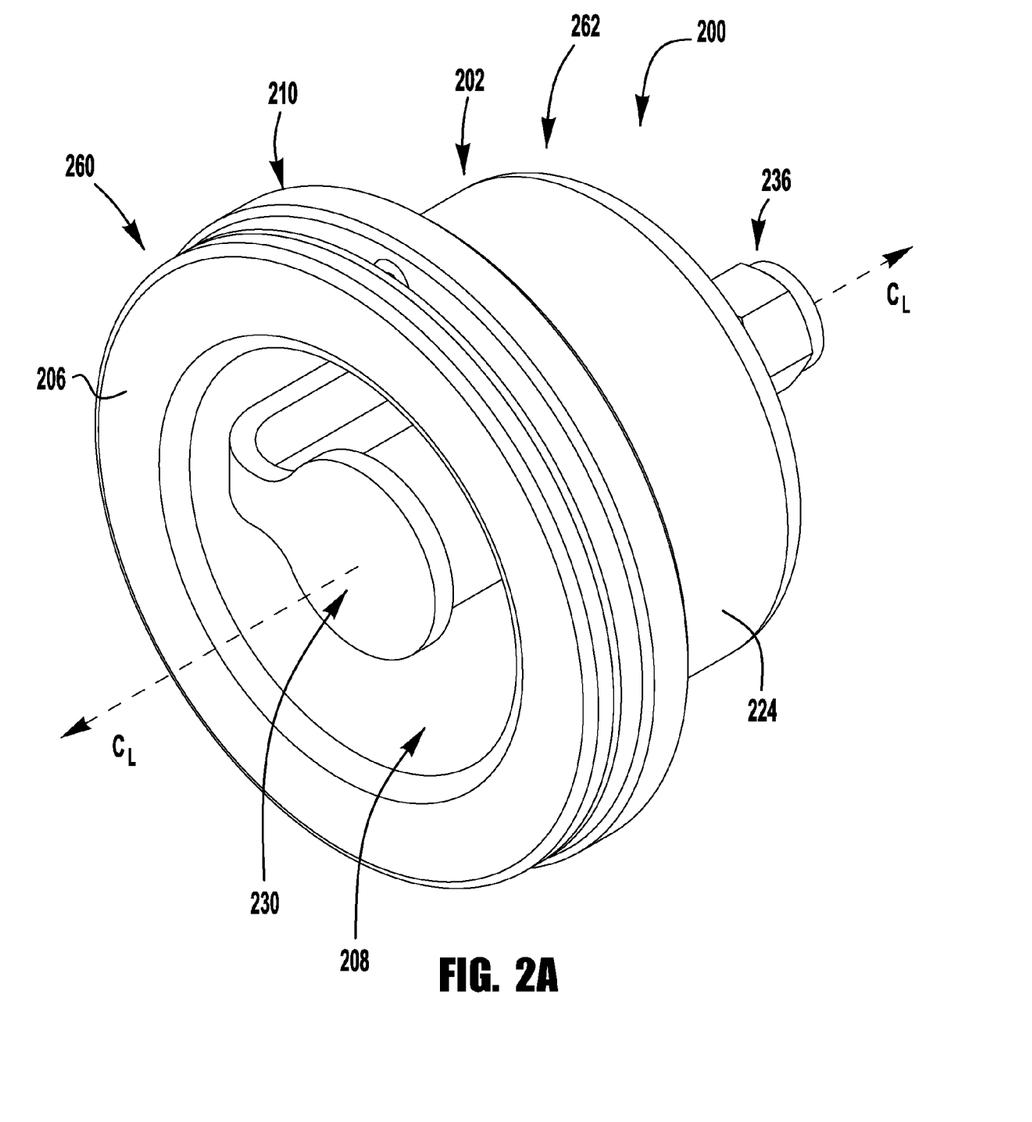
FIG. 2A is a perspective view of a fuel port according to an embodiment of the present application.
Figure 2B:
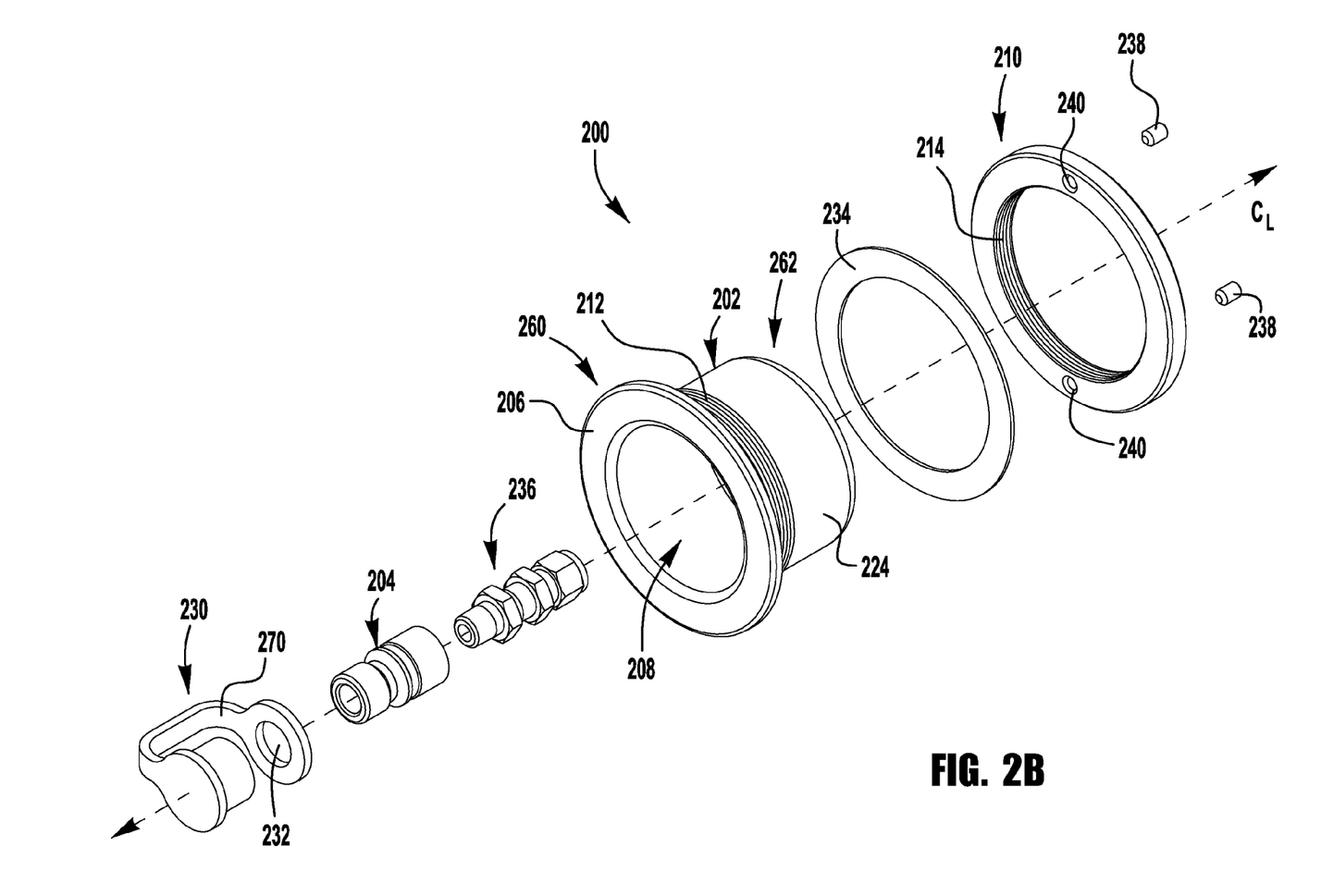
FIG. 2B is an exploded perspective view of the fuel port of FIG. 2A.
Figure 3:
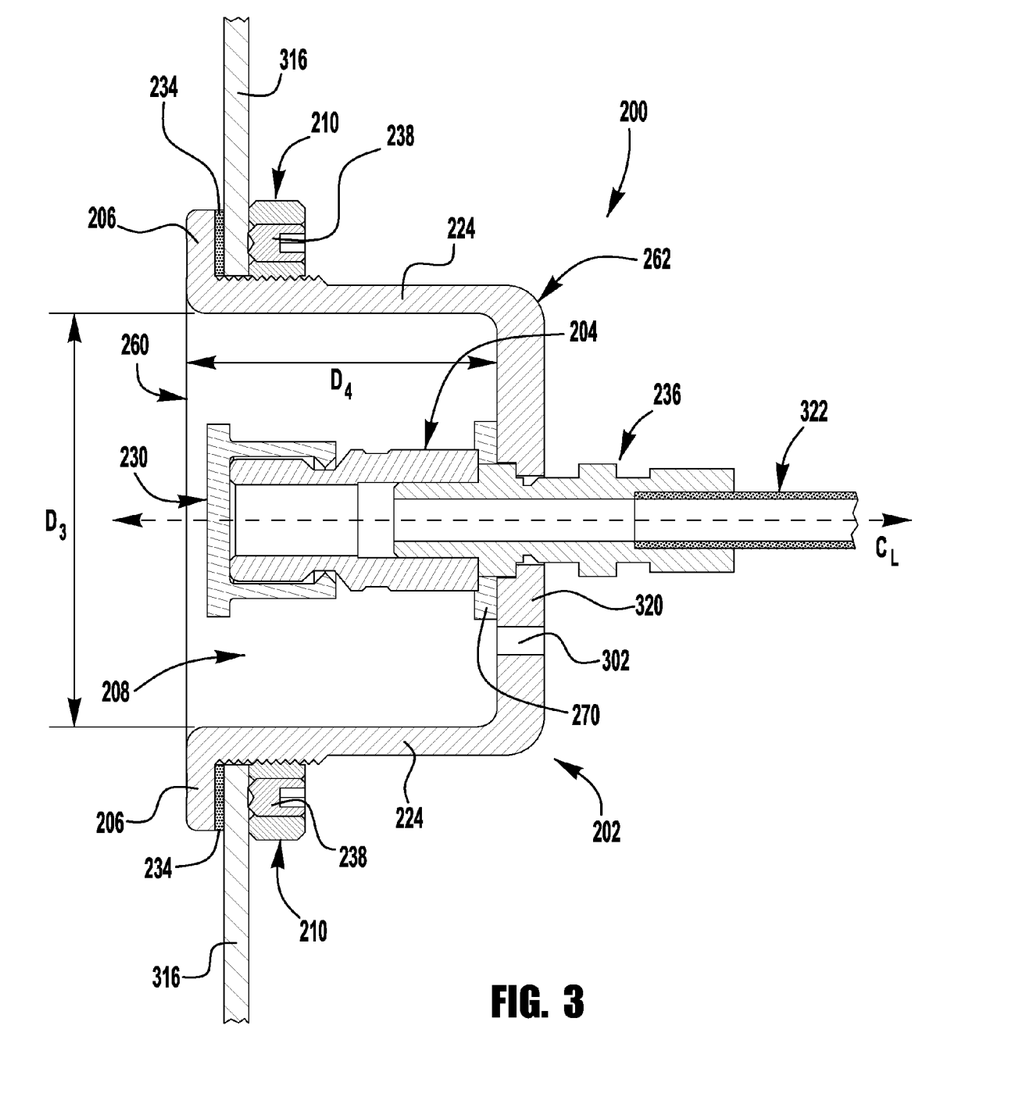
FIG. 3 is a cross sectional side view of the fuel port of FIG. 2A, wherein the fuel port is shown secured to an exemplary vehicle body.

FIGS. 2A-3 illustrate an embodiment of a fuel port 200 according to an embodiment of the present application. The fuel port 200 comprises a housing 202 having a first end 260 and a second end 262, a securing portion 210 formed as a mounting ring, a seal 234, and a fuel receptacle 204. The housing 202 forms a cavity 208 for the fuel receptacle 204. As shown, the housing 202 comprises a cylindrical sidewall 224 and an end wall 320 (FIG. 3) that form the cavity 208 for the receptacle 204.

As illustrated in FIG. 3, an opening for accessing the fuel receptacle 204 is located at the first end 260 of the housing 202 and the end wall 320 is located at the second end 262. The fuel receptacle 204 is secured within the cavity 208 such that it is protected by the sidewall 224 and the receiving end of the fuel receptacle does not extend outside the cavity. As shown, the fuel receptacle 204 is a NGV1 Standard CNG fuel receptacle. The fuel receptacle 204 may be a flush mounted fuel receptacle to minimize the mounting depth of the receptacle.

As illustrated in FIG. 3, the fuel receptacle 204 is secured to a connector or fitting 236. The fitting 236 is secured in an opening in the end wall 320 of the housing 202 and connected to the fuel line 322. In certain embodiments, the fitting 236 is a bulkhead nut fitting. As shown, the interior side of the end wall 320 is recessed to capture the fitting 236 and prohibit its movement such that only one wrench is needed to install the fitting. The housing 202 may be configured to accommodate fittings having a variety of different shapes and sizes. Further, as shown in FIG. 2, the housing comprises an opening 302 in the end wall 320 that permits drainage of the housing 202.

The cavity 208 of the housing 202 may be a variety shapes and sizes to accommodate a variety of fuel receptacles 204 having a variety of different shapes and sizes. For example, the inner diameter $D_3$ of the housing 202 may range between about 2 inches and about 4 inches. In certain embodiments, the inner diameter $D_3$ is about 2.75 inches. Further, the depth $D_4$ of the housing 202 (i.e., from the first end 260 to the interior side of the end wall 320) may range between about 1 inch and about 3 inches. In certain embodiments, the depth $D_4$ is about 2 inches.

As illustrated in FIGS. 2B and 3, the housing 202 comprises threads 212 on the outer surface of the sidewall 224 configured to mate with threads 214 on the inner surface of the mounting ring 210. The mounting ring 210 is placed over the second end 262 of the housing 202 and is threaded onto the outer surface of sidewall 224. Threading the mounting ring 210 onto the housing 202 moves the ring relative to a flange 206 extending from the sidewall 224. As shown, the flange 206 is disposed at the first end 260 of the housing 202 and circumferentially surrounds the opening to the cavity 208. As the mounting ring 210 is threaded onto the housing 202, the vehicle body 316 (FIG. 3) is captured or otherwise held between the flange and a face of the mounting ring 210. In certain embodiments, the mounting ring 210 may be knurled to facilitate tightening the ring against the vehicle body 316 by hand and without the aid of a hand tool.

As illustrated in FIGS. 2B and 3, once the mounting ring 210 is tightened against the vehicle body 316, set screws 238 are used to prohibit movement of the mounting ring relative to the housing 202 and the vehicle body. As shown, the set screws 238 are threaded into openings 240 in the mounting ring 210 and engage the vehicle body 316 to hold the mounting ring in place. Further, the seal 234 is positioned between the flange 206 and the vehicle body 316. As shown, the seal 234 is a ring gasket that is compressed as the mounting ring 210 is tightened. The seal 234 is configured to prohibit the passage of water or other liquids between the fuel port 200 and vehicle body 316. The seal 234 may be constructed from a variety of materials, such as, for example, neoprene, rubber, or the like.

The housing 202 may be constructed of a variety of materials and may be formed from a single piece material or one or more components integrally formed or otherwise secured together. As illustrated in FIGS. 2B and 3, the housing 202 is cup shaped and formed from a unitary piece of material. The second end 262 of the housing 202 comprises a rounded edge between the sidewall 224 and the end wall 320 such that the second end is dome shaped. Exemplary materials for the housing 202 and the mounting ring 210 include, but are not limited to, plastic, liquid photopolymers, ferrous materials such as steel or stainless steel, or non-ferrous materials such as aluminum. In certain embodiments, the housing 202 and the mounting ring 210 are constructed of aluminum.

As illustrated in FIGS. 2B and 3, the fuel port 200 comprises a cap 230 for protecting the receiving end of the fuel receptacle 204, e.g., from dust, water, etc. The cap 230 comprises a tether 270 having an opening 232. As illustrated in FIG. 3, the opening 232 in the tether 270 is positioned around the fitting 236 and the tether is disposed between the fuel receptacle 204 and the interior side of the end wall 320 to secure the cap 230 to the fuel port 200. Further, as shown, the strap or tether 270 for the dust cap 230 does not extend outside the cavity 208 of the housing 202.

An exemplary method of installing the fuel port 200 comprises forming a circular opening in a portion of the vehicle, such as a body panel, hood, bed, cab, bumper, trunk or other portion of the vehicle. The diameter of the opening is generally just slightly larger than the outer diameter of the sidewall 224 of the fuel port 200. The seal 234 is placed over the second end 262 of the housing 202 and positioned adjacent the flange 206. The housing 202 is inserted into the opening until the flange 206 compresses the seal 234 against the vehicle body 316 around the opening. The fitting 236, fuel receptacle 204, and cap 230 may be secured to the housing 202 before or after the housing is inserted into the opening. The mounting ring 210 is threaded onto the housing 202 and moved toward to the first end 260 of the housing until the locking face is tightened against the vehicle body 316. As such, the vehicle body 316 is captured or held between the flange 206 and the mounting ring 210. The set screws 238 are threaded into the openings 240 in the mounting ring 210 to engage the vehicle body 316 and prohibit movement of the mounting ring relative to the housing 202 and the vehicle body. The fuel line 322 is connected to the fitting 236 that is in fluid communication with the fuel receptacle 204.

Figure 4:
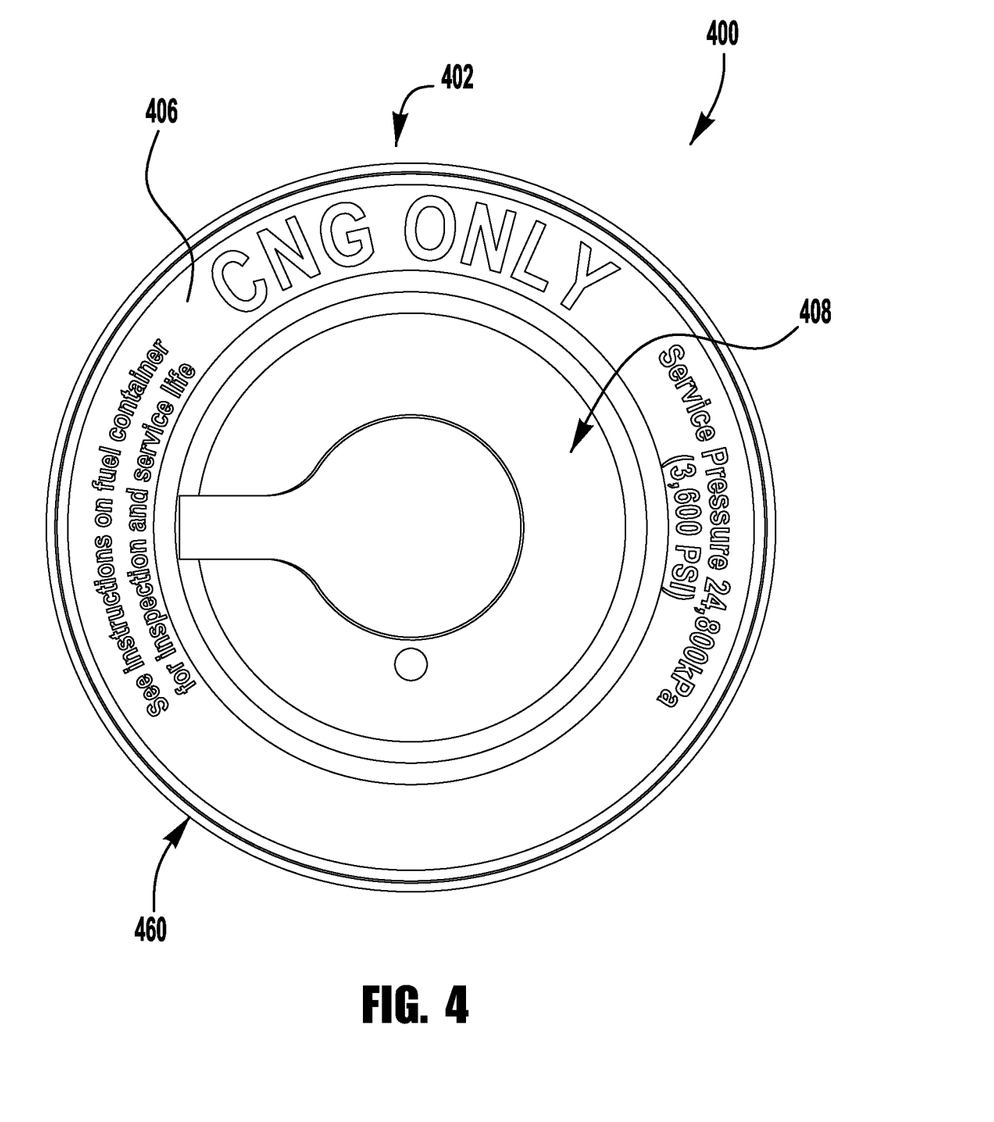
FIG. 4 is a front view of a fuel port according to an embodiment of the present application.

FIG. 4 illustrates a fuel port 400 according to an embodiment of the present application. The fuel port 400 comprises a body portion 402 having a shoulder or flange 406 disposed at a first end 460 of the body portion. The body portion 402 forms a cavity 408 for a CNG fuel receptacle. The flange 406 circumferentially surrounds an opening to the cavity 408. The visible or exterior face of the flange 406 may be used to display markings and other indicia. In certain embodiments, the flange 406 is used to display various refueling requirements, e.g., the CNG refueling requirements found in NFPA52-2010. For example, as shown, the flange 406 displays the type of fuel, service pressure, and other refueling requirements, thus reducing the amount of labeling needed on the vehicle. Further, as illustrated in FIG. 4, no bolts or other fasteners are visible on the visible or exterior portion of the fuel port 400 (i.e., the portion of the fuel port extending from the vehicle body).

As described herein, when one or more components are described as being connected, joined, affixed, coupled, attached, or otherwise interconnected, such interconnection may be direct as between the components or may be in direct such as through the use of one or more intermediary components. Also as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasably or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated. The words of the claims have all of their full ordinary meanings and the specification does not limit the terms of the claims in any way.

I claim:
1. A fuel port, comprising:
a fuel receptacle;
a body portion that forms a cavity for the fuel receptacle, wherein the body portion comprises a first end, a second end, at least one sidewall extending between the first end and the second end, and at least one flange extending from the sidewall; and
one or more securing portions movably coupled to the body portion, wherein the one or more securing portions are configured to hold a portion of a device between the flange of the body portion and the one or more securing portions to secure the fuel port to the device.

2. The fuel port of claim 1, wherein the fuel receptacle is received in the cavity and secured to the body portion such that no portion of the fuel receptacle extends beyond the first end of the body portion.

3. The fuel port of claim 1, wherein the body portion comprises a first attachment portion configured to mate with a second attachment portion of the one or more securing portions to movably couple the body portion to the one or more securing portions.

4. The fuel port of claim 3, wherein the first and second attachment portions are configured such that the one or more securing portions slide longitudinally along the sidewall of the body portion.

5. The fuel port of claim 3, wherein the first and second attachment portions are configured such that the one or more securing portions are rotatably coupled to the body portion.

6. The fuel port of claim 5, wherein the first attachment portion comprises threads configured to mate with threads of the second attachment portion.

7. The fuel port of claim 6, wherein the one or more securing portions comprise a mounting ring that is threaded onto an outer surface of the sidewall to hold the portion of the device between the flange of the body portion and the mounting ring to secure the fuel port to the device.

8. The fuel port of claim 7, wherein the mounting ring comprises a locking face and one or more set screws that engage the portion of the device to prohibit movement of the mounting ring relative to the device.

9. The fuel port of claim 7, wherein the portion of the device is held between a circumferential face of the flange and a circumferential face of the mounting ring when the fuel port is secured to the device.

10. The fuel port of claim 7 further comprising a seal disposed between the flange of the body portion and the portion of the device when the fuel port is secured to the device.

11. The fuel port of claim 1, wherein the one or more securing portions are hidden behind the portion of the device when the fuel port is secured to the device.

12. The fuel port of claim 1, wherein at least a portion of the sidewall is cylindrical and comprises a threaded region.

13. The fuel port of claim 12, wherein the first end of the body portion is open for accessing the fuel receptacle disposed in the cavity, and wherein the second end of the body portion comprises an end wall, and wherein the fuel receptacle is secured to the end wall.

14. The fuel port of claim 13, wherein the body portion is cup shaped.

15. The fuel port of claim 13, wherein the flange circumferentially surrounds the cavity and is disposed at the first end of the body portion.

16. The fuel port of claim 1, wherein the inner diameter of the cavity is between about 2 inches and about 4 inches.

17. The fuel port of claim 1, wherein the flange of the body portion at least partially surrounds an opening in the device when the fuel port is secured to the device.

18. The fuel port of claim 1, wherein the flange of the body portion circumferentially surrounds an opening in the device when the fuel port is secured to the device.

19. The fuel port of claim 1, wherein the flange of the body portion comprises an outer face and an inner face, wherein the inner face is positioned adjacent the portion of the device when the fuel port is secured to the device, and wherein the outer face comprises indicia related to refueling of the device.

20. The fuel port of claim 1, wherein the fuel receptacle is a compressed natural gas fuel receptacle.

21. The fuel port of claim 1, wherein a cap is coupled to an end of the fuel receptacle, and wherein the cap is secured to the fuel receptacle by a tether, and wherein the fuel receptacle is received in an opening of the tether and the tether is disposed between the fuel receptacle and an end wall of the body portion, and wherein the tether does not protrude outside the first end of the fuel port.

22. The fuel port of claim 1, wherein the device is a vehicle configured to operate using compressed natural gas fuel.

23. A fuel port for a vehicle configured to operate using compressed natural gas fuel, comprising:
 a compressed natural gas fuel receptacle;
 a housing that forms a cavity for the fuel receptacle, wherein the housing comprises a first end, a second end, a cylindrical sidewall extending between the first end and the second end, and a flange extending from the sidewall at the first end; and
 a mounting ring threadably coupled to an outer surface of the sidewall, wherein the mounting ring is configured to hold a portion of the vehicle between the flange of the housing and the mounting ring to secure the fuel port to the vehicle; and
 wherein the flange circumferentially surrounds an opening in the vehicle when the fuel port is secured to the vehicle and the portion of the vehicle is held between a circumferential face of the flange and a circumferential face of the mounting ring when the fuel port is secured to the vehicle.

24. The fuel port of claim 23, wherein the mounting ring comprises one or more set screws that engage the portion of the vehicle to prohibit movement of the mounting ring relative to the vehicle.

25. The fuel port of claim 23 further comprising a seal disposed between the circumferential face of the flange and the portion of the vehicle when the fuel port is secured to the vehicle.

26. The fuel port of claim 23, wherein the fuel receptacle is received in the cavity and secured to the housing such that no portion of the fuel receptacle extends beyond the first end of the housing.

27. The fuel port of claim 26, wherein the mounting ring is hidden behind the portion of the vehicle when the fuel port is secured to the vehicle.

28. A method of installing a fuel port, comprising the steps of:
 utilizing a fuel port comprising a fuel receptacle, a body portion that forms a cavity for the fuel receptacle, and one or more securing portions movably coupled to the body portion, wherein the body portion comprises a first end, a second end, at least one sidewall extending between the first end and the second end, and at least one flange extending from the sidewall;
 inserting the body portion of the fuel port into an opening in a device until the flange contacts a portion of the device around the opening; and
 coupling the one or more securing portions to the body portion to hold the portion of the device between the flange of the body portion and the one or more securing portions to secure the fuel port to the device.

29. The method of claim 28, wherein the device is a vehicle configured to operate using compressed natural gas fuel.

30. The method of claim 28 further comprising forming an opening in the device having a diameter that is just slightly larger than the outer diameter of the sidewall of the body portion.

31. The method of claim 28 further comprising positioning a seal between the flange and the portion of the device.

32. The method of claim 28 further comprising securing the fuel receptacle to the body portion and connecting a fuel line to the fuel receptacle.

33. The method of claim 28 further comprising utilizing a locking device of the one or more securing portions to engage the portion of the device and prohibit movement of the one or more securing portions relative to the device.

* * * * *